W. A. TURBAYNE.
ELECTRICAL SYSTEM OF REGULATION AND STARTING.
APPLICATION FILED APR. 17, 1914.
1,252,511. Patented Jan. 8, 1918.
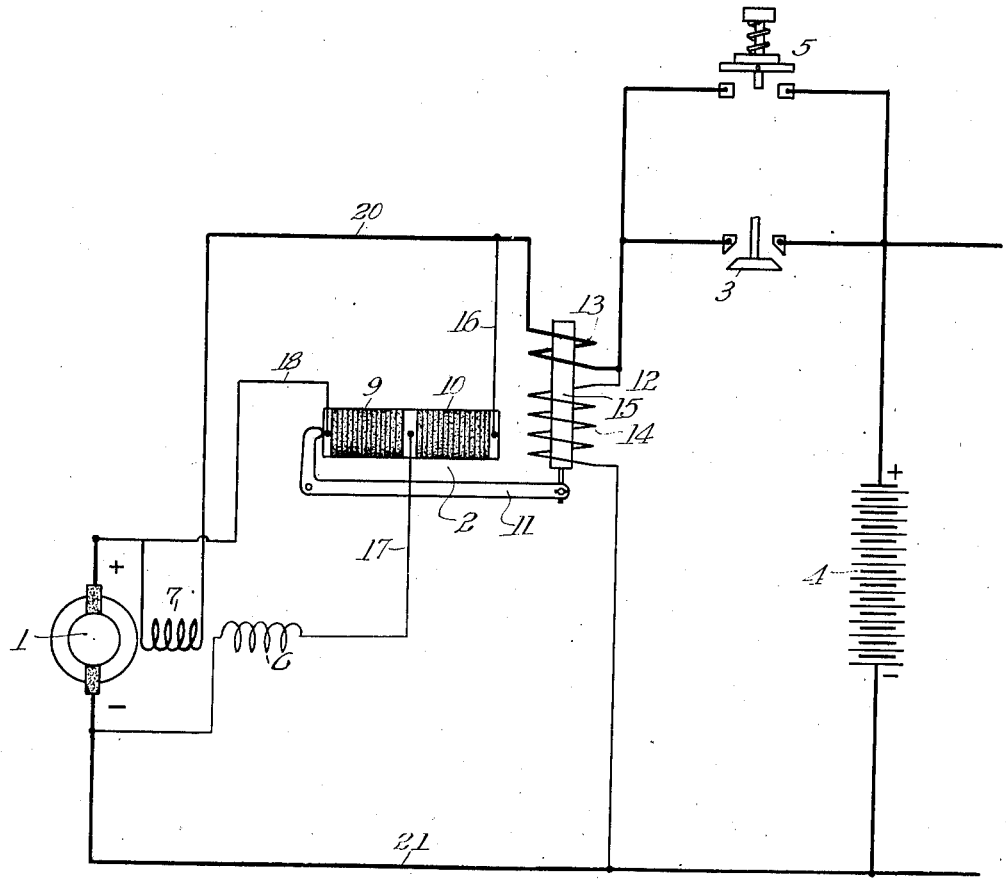

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

ELECTRICAL SYSTEM OF REGULATION AND STARTING.

1,252,511.  Specification of Letters Patent.  Patented Jan. 8, 1918.

Application filed April 17, 1914. Serial No. 832,505.

*To all whom it may concern:*

Be it known that I, WILLIAM A. TURBAYNE, a citizen of the United States, residing at Niagara Falls, in the county of Niagara and State of New York, have invented new and useful Improvements in Electrical Systems of Regulation and Starting, of which the following is a full, clear, concise, and exact description, reference being had to the accompanying drawing, forming a part of this specification.

This invention relates to an electrical system of regulation and starting.

The invention is particularly applicable to variable speed battery charging generators such as are used in train lighting, or in automobile starting and lighting systems.

The objects of my invention are:

To provide a differentially wound generator with a single variable resistance regulator controlling both the series and the shunt windings.

To provide an improved variable pressure regulator in which a small change in pressure produces a very marked effect in regulation.

To provide an improved variable pressure regulator which operates to regulate the out-put of the generator during charging and which automatically dis-connects itself when the generator is operated as a starting motor.

To provide a starting and charging system with a regulator operating to limit the current out-put of the generator during charging and to eliminate itself automatically during starting.

The single figure of the drawing is a diagrammatic illustration of a system employing my invention.

The main elements in the system are a differentially wound dynamo electric machine having an armature 1 adapted to be run at variable speeds, a carbon pile regulator 2 for controlling the out-put of the generator, an automatic switch 3, a starting switch 5 and a storage battery 4.

The generator is supplied with a shunt field 6, which furnishes the main excitation for the machine, and a differential series field 7. The variable pressure resistance 2 may be made up of a plurality of carbon disks divided into sections 9 and 10. The pressure upon these sections is controlled by means of a bell crank lever 11 and operated by the plunger 15 of a solenoid 12 having series and shunt windings 13 and 14 respectively. The carbon pile is connected in shunt of the series winding 7 by wires 18 and 16 attached at the extremities of the carbon pile. At some intermediate point, the shunt field 6 is connected by means of a wire 17. As the generator begins to build up, the shunt field 6 is excited, the resistance in its circuit at this time being a minimum, due to the fact that at this time, the solenoid plunger 15 acting through the arr 11 exerts the maximum pressure. The differential series field is practically short circuited at this time, as the resistance of the sections 9 and 10 is at a minimum due to the compressed condition of the carbon pile. When the proper voltage has been attained, the automatic switch 3 operated by windings (not shown) connects the generator to the storage battery 4.

The carbon pile regulator 2 is subject to the control of both the current coil 13 and the shunt coil 14 so that excessive charging of the battery is prevented. When the voltage of the battery rises at the end of the charge, the regulator will be subject to the shunt coil 14 and will produce a taper charge.

The differential field winding 7 consists of a greater number of turns than is usually employed in this type of machine. A greater number of turns are desirable as a part of the current is always shunted through the carbon pile 2. A decrease in pressure of the carbon pile 2 increases the resistance thereof and produces two distinct and separate effects. It causes first, an increased flow of current in the coil 7, and second, a decrease of current flowing in the coil 6. This is readily understood when it is considered that an increase of resistance through the circuit 18—2—16, which is in shunt of the differential coil 7, causes a relatively greater flow through its coil 7 in accordance with the well known law governing parallel circuits. At the same time, the resistance included in the circuit of the shunt winding 6 is increased, causing a decrease of the magnetizing effect of this winding. Thus a very slight change in the pressure on the carbon pile 2 will produce a very marked effect upon the regulation of the machine. The tendency to heat the carbon pile 2 depends upon the current flowing therethrough. During the time that the machine is building up, the maximum flow of current through the carbon pile occurs, but as soon as the machine is operating at normal voltage, the tendency will be to reduce the current flowing through this pile and at the time when the regulating action is at or near maximum, a minimum of current will be flowing through the resistance. This is an especially desirable condition, not only because there is a minimum waste of current in the rheostat, but because it avoids the undesirable heating of the rheostat.

The system may be employed as a starting and charging system in motor vehicles. When used in such relation, the generator may be used as a starting motor. The switch 5 closes the circuit from the battery to the motor to crank the engine for starting purposes.

Current flows from the battery, through the starting switch 5, through the series winding 13 of the regulator solenoid, over the lead 20, the series winding 7, the armature 1, and back to the battery over the lead 21. Part of this current is diverted through the shunt winding 14 of the regulating solenoid and part of the current is shunted through the carbon pile resistance. The initial rush of starting current, which may reach quite a high value, operates the solenoid 12 because of the heavy current in the winding 13 to release the pressure on the carbon pile 2. The shunt across the series winding is practically opened and at the same time the resistance of the shunt winding 6 is increased to a very high value so that the machine operates substantially as a series motor. Any current which may flow through the shunt field winding now aids the series winding as the direction of magnetization of the two windings is now the same.

A very decided advantage is secured by the above mechanism in that the carbon pile secures regulation when the generator is the source of current, but is practically disconnected when the battery furnishes starting current to the motor. During this operation, the shunt winding 14 of the solenoid 12 acts in opposition to the series winding 13, but the series winding 13 completely overpowers the shunt winding because of the heavy flow of current.

The operation of the system may briefly be described as follows: Under a condition of rest, the maximum pressure will be exerted upon the carbon pile so that when the armature of the generator begins to rotate, the machine will build up practically as a machine with a short shunt field winding. Any regulation of the pressure exerted upon the carbon pile through the action of the regulating solenoid will increase the resistance in the shunt field circuit and simultaneously increase the resistance of the shunt around the differential winding. By these means, a regulation of the generator will be brought about by the combining effects due to weakening the shunt field and increasing the differential series field. As soon as the voltage rises to a point above which it is not desired to charge the battery, the shunt coil 14 will assume control to regulate the out-put of the machine. A very slight movement of the carbon pile, causing a comparatively small change in its resistance, effects a marked change in the effective field flux.

When the system is operated as a starting system, by closing the starting switch, the regulator which has been employed to limit the flow of current is automatically eliminated and allows the generator to be operated substantially as a series motor.

The system above described is a particular embodiment of the invention, but it is obvious that the same is capable of being embodied in other structures and in other relations, and although the invention has been explained with reference to the details of this particular embodiment, the invention is not to be limited to any of the details described except as limitations may be imposed in the following claims:

What is claimed is:

1. Regulating means for a variable speed generator having a shunt winding and a series differential winding, said means including a variable resistance in shunt to said series winding, having a part of said resistance in series with the shunt winding.

2. In an electric circuit, including a generator having a shunt winding and a series differential winding, a variable pressure resistance in shunt to said series winding, a part of said resistance being in series with said shunt winding, and automatic means for varying the pressure of said resistance.

3. In an electric circuit including a generator having a shunt winding and a series winding, a variable resistance shunting said series winding and having a part in series with said shunt winding, and electro-magnetic means controlling said variable resistance.

4. In an electric circuit, a variable speed generator having a shunt field winding and a series field winding, a variable resistance governing both said windings, and electromagnetic means governing said resistance.

5. In an electric circuit including a generator having a shunt winding and a series differential winding, a carbon disk regulator furnishing two paths for current, one of said paths being in series with said shunt winding and the other in shunt to said series winding.

6. In an electric circuit including a variable speed generator, a shunt field winding, a differential series field winding, and a single variable pressure resistance means for simultaneously increasing the current through the series field winding and directly decreasing the current through the shunt field winding.

7. In an electric circuit, including a variable speed generator having a shunt field winding and a differential series field winding, a variable pressure resistance means for simultaneously increasing the current through the series winding and directly decreasing the current through the shunt field winding, and electro-magnetic means for varying the pressure on said resistance means.

8. In an electric circuit, including a variable speed generator, a shunt field winding, a differential series field winding, a variable pressure resistance means for simultaneously increasing the current through the series field winding and decreasing the current through the shunt field winding, and electro-magnetic means governing the pressure on said resistance means, said electro-magnetic means including a shunt winding and a series winding.

9. In an electric circuit, including a generator, a shunt field winding and a series differential field winding, variable resistance means in shunt of said series winding and a part thereof in series with the shunt winding, and electro-magnetic means including a series and a shunt winding controlling said variable resistance means.

10. In a system of the class described, a dynamo electric machine having a shunt field winding and a series winding, a variable resistance means in shunt of said series winding and part thereof in series with said shunt winding, and electro-magnetic controlling means having a series winding to substantially eliminate said resistance means from operative circuit during starting.

11. In a system of the class described, a dynamo electric machine having a shunt field winding and a series winding, a variable resistance means in shunt of said series winding and having part thereof in series with said shunt winding, and electro-magnetic means for varying said resistance to limit the out-put of the machine when operated as a generator and to substantially eliminate said resistance from operative circuit when said machine is operated as a motor.

12. In a system of the class described, a dynamo electric machine, having a shunt winding and a series differential winding, a single variable resistance means for controlling the current flow in said windings, and electro-magnetic means governing said variable resistance.

13. In a system of the class described, a dynamo electric machine, having a shunt winding and a series winding, a variable resistance means in shunt of said series winding and having part thereof in series with said shunt winding, a starting switch and means controlled by said starting switch to substantially eliminate said variable resistance from operative circuit.

In witness whereof, I have hereunto subscribed my name in the presence of two witnesses.

WILLIAM A. TURBAYNE.

Witnesses:
C. C. CARPENTER,
R. J. ELLIS.